US007785052B2

(12) United States Patent
Kanczuzewski et al.

(10) Patent No.: US 7,785,052 B2
(45) Date of Patent: Aug. 31, 2010

(54) METHOD AND DEVICE FOR RESTRAINING A CARGO PALLET

(75) Inventors: Thomas E. Kanczuzewski, South Bend, IN (US); John Townsend, Paw Paw, MI (US); John W. Doster, Granger, IN (US)

(73) Assignee: Logistick, Inc., South Bend, IN (US)

( * ) Notice: Subject to any disclaimer, the term of this patent is extended or adjusted under 35 U.S.C. 154(b) by 589 days.

(21) Appl. No.: 11/690,667

(22) Filed: Mar. 23, 2007

(65) Prior Publication Data

US 2008/0232921 A1    Sep. 25, 2008

(51) Int. Cl.
*B60P 7/08* (2006.01)

(52) U.S. Cl. .......................................... 410/94; 410/121

(58) Field of Classification Search .................. 410/94, 410/121, 90, 95, 91, 155, 153, 46; 188/32; 224/42.33, 403, 404; 248/351
See application file for complete search history.

(56) References Cited

U.S. PATENT DOCUMENTS

| | | | |
|---|---|---|---|
| 969,002 A | 8/1910 | Teachout | |
| 1,401,419 A | 12/1921 | Mcnally | |
| 1,951,660 A | 3/1934 | Klaudt | |
| 2,124,082 A | 7/1938 | Reifer | |
| 2,414,160 A | 1/1947 | Moon | |
| 2,461,767 A * | 2/1949 | Peyton | 410/121 |
| 2,464,080 A | 3/1949 | Hankins | |
| 2,467,681 A | 4/1949 | McKinney | |
| 2,468,101 A | 4/1949 | Nampa | |
| 2,697,631 A | 12/1954 | Miller | |
| 2,752,864 A | 7/1956 | McDougal, Sr. et al. | |
| 2,766,704 A | 10/1956 | McMahon | |
| 2,845,245 A | 5/1958 | Gray et al. | |
| 2,912,939 A | 11/1959 | Miner, Jr. et al. | |
| 2,980,037 A | 4/1961 | Elsner | |
| 2,993,708 A | 7/1961 | Holman, Jr. | |
| 3,177,007 A | 4/1965 | Oren | |
| 3,344,750 A | 10/1967 | Kostrewa | |
| 3,559,591 A | 2/1971 | Breen et al. | |
| 3,590,746 A | 7/1971 | Gibson | |
| 3,606,842 A * | 9/1971 | Verbick | 410/94 |

(Continued)

FOREIGN PATENT DOCUMENTS

GB    1209255    10/1970

*Primary Examiner*—Stephen Gordon
(74) *Attorney, Agent, or Firm*—Barnes & Thornburg LLP

(57) ABSTRACT

A method and device for restraining a cargo pallet disposed on the floor of a truck or other container comprising positioning adjacent the cargo pallet a plastic brace, engaging the plastic brace and the cargo pallet, and securing the plastic brace to the floor with a fastener. The plastic brace may have a monolithic construction and may be formed by injection molding. The plastic brace may comprise a first wall having a first side for engaging the floor defining a hole, and a second side; a second wall having a first side for engaging the cargo pallet, and a second side, the second wall extending at an angle of about 90 degrees relative to the first wall; and a gusset interconnecting the second side of the first wall with the second side of the second wall. The plastic brace may further include a raised reinforcement extending from the second side of the first wall and disposed about the hole. The raised reinforcement may have a truncated conical configuration.

12 Claims, 5 Drawing Sheets

U.S. PATENT DOCUMENTS

| | | |
|---|---|---|
| 3,712,663 A | 1/1973 | Laven |
| 3,836,174 A | 9/1974 | Holman, Jr. |
| 3,995,565 A | 12/1976 | Kersey |
| 4,026,508 A | 5/1977 | Ziegler |
| 4,080,906 A | 3/1978 | Brown |
| 4,264,251 A | 4/1981 | Blatt |
| 4,278,376 A | 7/1981 | Hunter |
| 4,396,325 A | 8/1983 | Joice-Cavanagh |
| 4,432,678 A | 2/1984 | Liebel |
| 4,498,824 A | 2/1985 | Kinkle |
| 4,616,757 A | 10/1986 | Hobson |
| 4,700,918 A | 10/1987 | Andrasko, Jr. |
| 4,735,468 A | 4/1988 | Taylor, Jr. et al. |
| 4,756,498 A | 7/1988 | Frye |
| 4,830,558 A | 5/1989 | Sweeney |
| 4,846,610 A | 7/1989 | Schoenleben |
| 4,880,342 A | 11/1989 | Pradovic |
| 4,932,817 A | 6/1990 | Mattare |
| 4,955,771 A | 9/1990 | Bott |
| 4,962,907 A | 10/1990 | Gary |
| 4,982,922 A | 1/1991 | Krause |
| 5,028,184 A | 7/1991 | Krause |
| 5,156,110 A | 10/1992 | Fuller |
| 5,219,251 A | 6/1993 | Kanczuzewski |
| 5,259,712 A | 11/1993 | Wayne |
| 5,281,063 A | 1/1994 | Austin, III |
| 5,320,464 A | 6/1994 | Long et al. |
| 5,326,204 A | 7/1994 | Carlson et al. |
| 5,362,184 A | 11/1994 | Hull et al. |
| 5,370,482 A | 12/1994 | Long |
| 5,494,389 A | 2/1996 | Kanczuzewski |
| 5,636,951 A * | 6/1997 | Long et al. ............ 410/85 |
| 5,688,087 A | 11/1997 | Stapleton et al. |
| 5,807,047 A | 9/1998 | Cox |
| 6,086,299 A | 7/2000 | Kanczuzewski |
| 6,431,804 B1 * | 8/2002 | Wetzig, III ............ 410/94 |

* cited by examiner

METHOD AND DEVICE FOR RESTRAINING A CARGO PALLET

The present invention relates generally to a method and device for restraining a cargo pallet disposed on the floor of a truck or other container.

BACKGROUND

Cargo transported for commercial and other uses is often shipped in semi-trailers or other trucks, railcars, ships, aircraft or other shipping vehicles. The cargo often rests on cargo pallets to enable the cargo to be readily moved onto the truck before transporting and readily removed from the truck after transporting. In most instances, shifting or translation of the cargo pallets within the shipping vehicle can occur during shipping which can cause damage to the cargo.

SUMMARY

The present disclosure is directed to a method and device for restraining a cargo pallet disposed on the floor of a truck or other container. The method comprises positioning adjacent the cargo pallet a plastic brace, engaging the plastic brace and the cargo pallet, and securing the plastic brace to the floor with a fastener. The plastic brace may have a monolithic construction and may be formed, for example, by injection molding or by any other suitable means.

The plastic brace may comprise a first wall having a first side for engaging the floor defining at least one hole for receiving the fastener, and a second side; a second wall having a first side for engaging the cargo pallet, and a second side, the second wall extending at an angle of about 90 degrees relative to the first wall; and one or more gussets interconnecting the second side of the first wall with the second side of the second wall. The plastic brace may further include at least one raised reinforcement extending from the second side of the first wall and disposed about the hole. Each of the one or more raised reinforcements may have a truncated conical configuration. The plastic brace may be used with any type of cargo pallet.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

DETAILED DESCRIPTION

Figure 1:
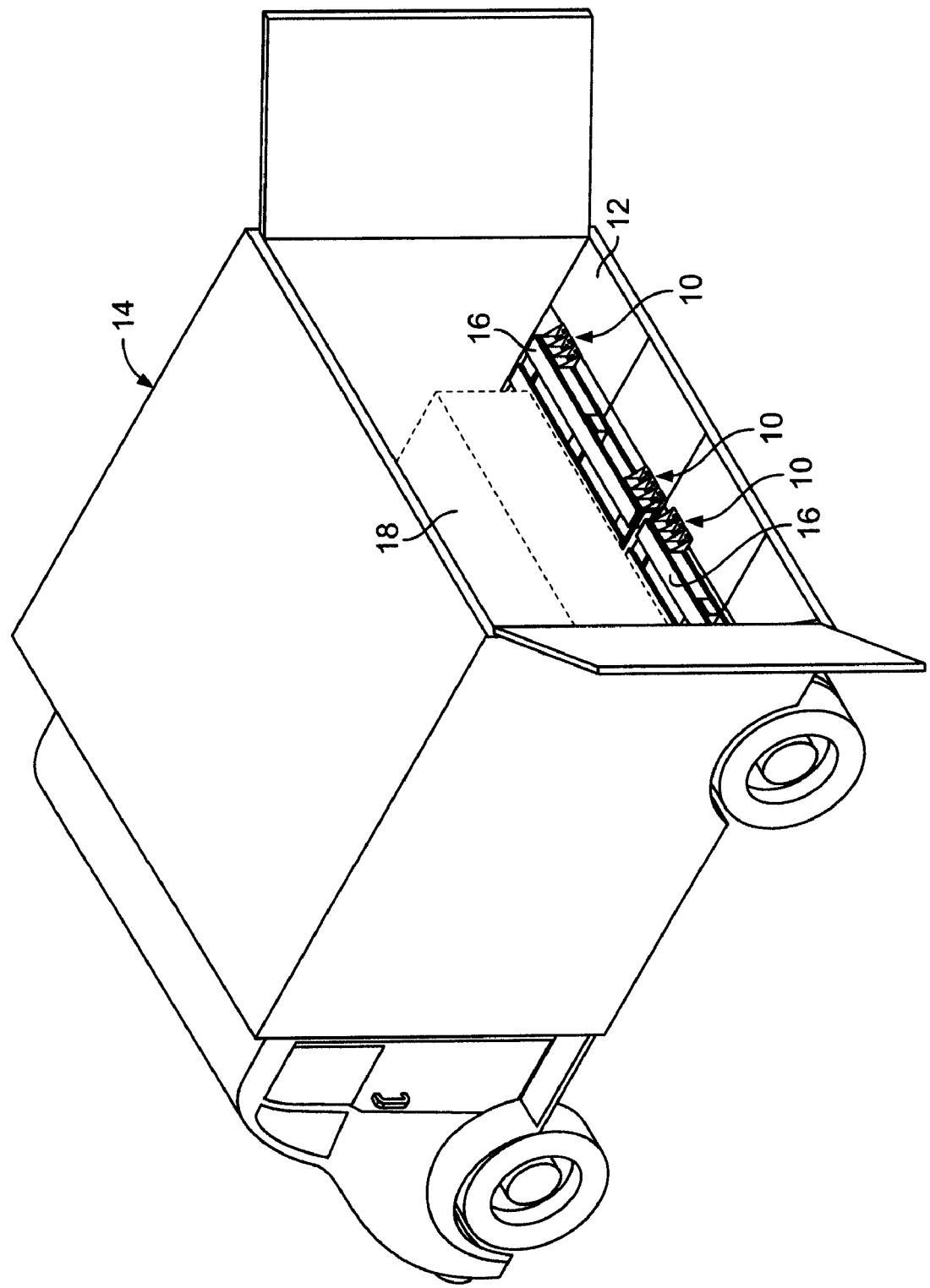
FIG. 1 is a perspective view of a plurality of plastic braces in accordance with an illustrated embodiment of the present disclosure secured to a floor of a truck restraining a pair of cargo pallets disposed on the floor of the truck and cargo disposed on the cargo pallets.
Figure 2:
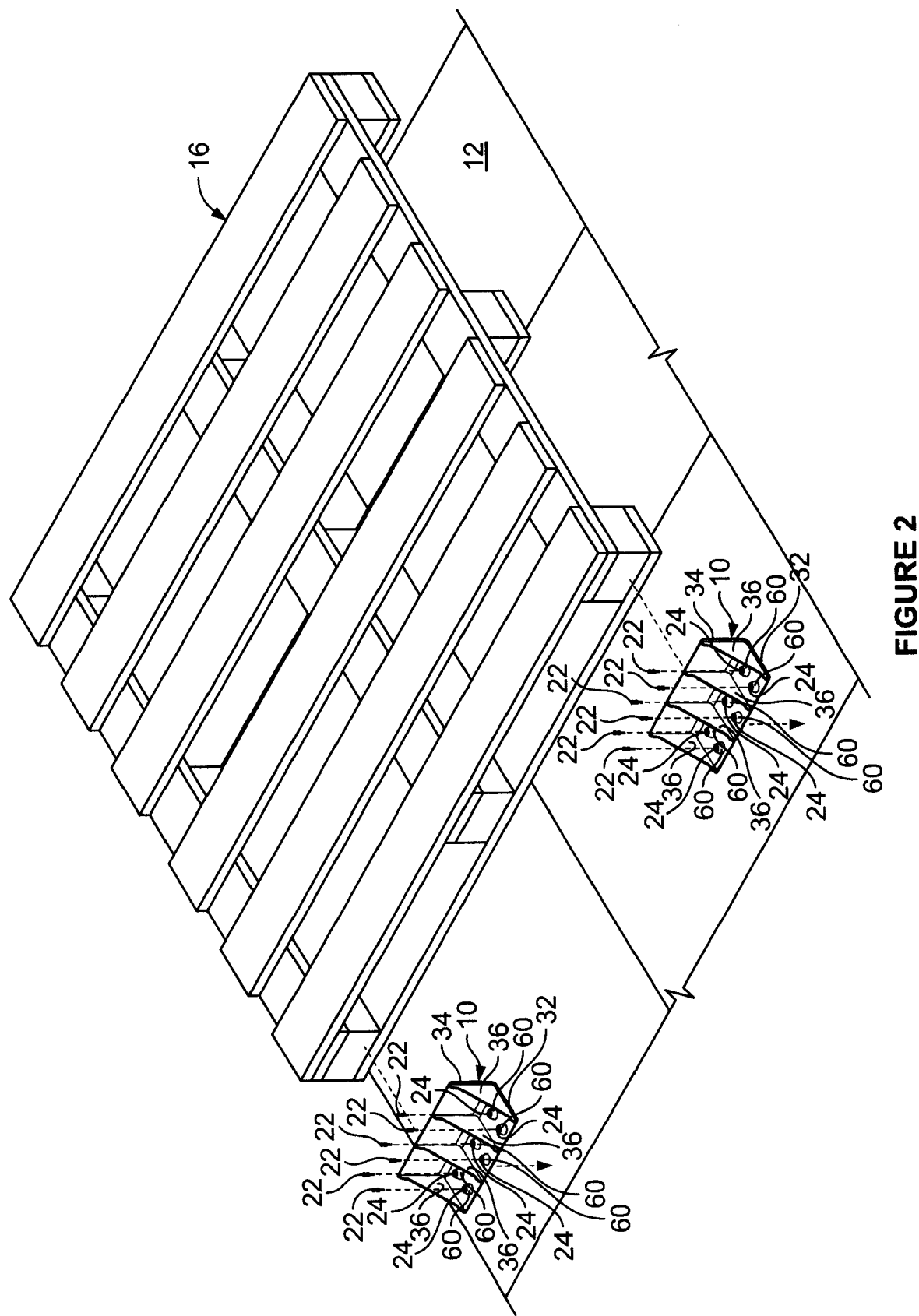
FIG. 2 is a partial perspective and exploded view of FIG. 1 illustrating a pair of the plastic braces, one of the cargo pallets, and the fasteners for securing the plastic braces to the floor of the container.

FIGS. 1-2 illustrate a plurality of plastic braces 10 in accordance with an embodiment of the present disclosure restraining on a wood floor 12 of a truck 14 a pair of cargo pallets 16 having cargo 18 disposed thereon. The plastic braces 10 are secured to the floor 12 by fasteners 22 which extend through holes 24 defined by the plastic braces and which are hammered into or otherwise secured to the floor 12 of the truck 14.

The plastic braces 10 in accordance with the present disclosure restrain movement of the cargo pallets 16 on the floor 12 of the truck 14 during shipment. One or more of the plastic braces 10 can be used to restrain one or more cargo pallets 16 on any other suitable truck, shipping vehicle or other container in accordance with other embodiments of the present disclosure, such as, for example, any type of truck, railcar, ship or aircraft.

Figure 3:
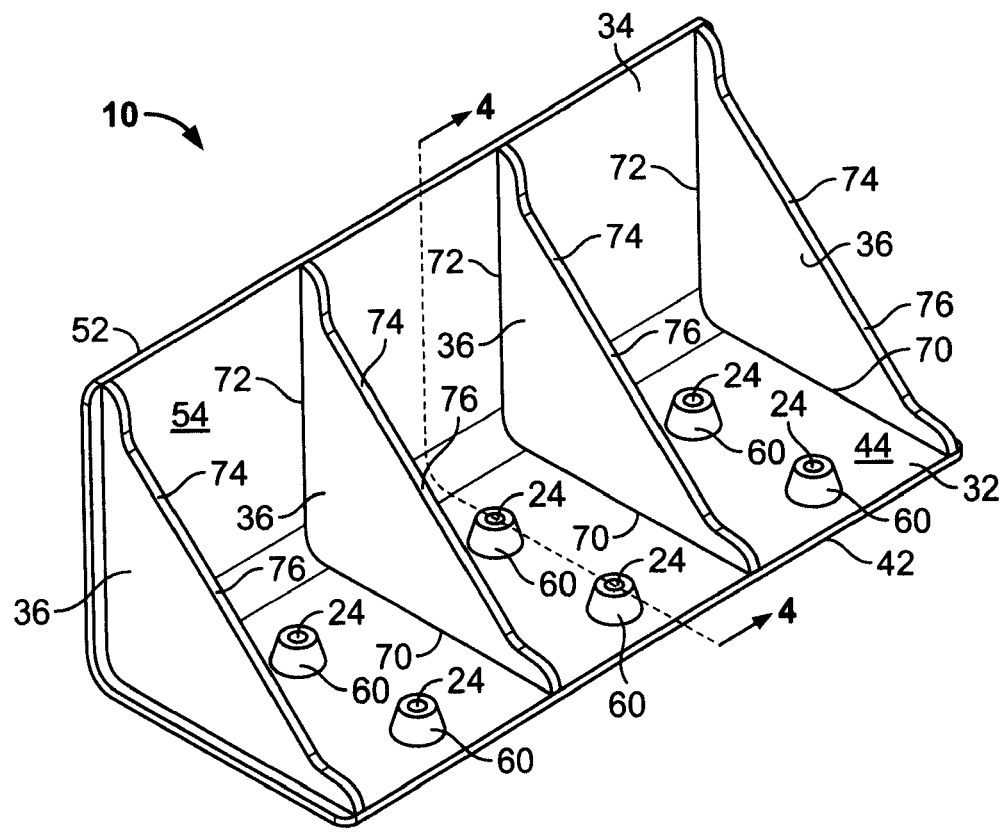
FIG. 3 is a perspective view of one of the plastic braces of FIG. 1.
Figure 4:
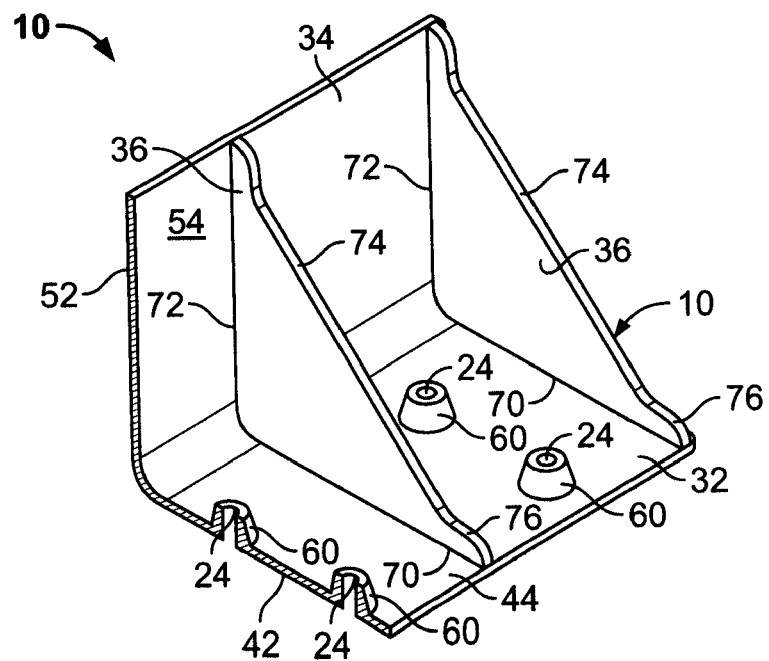
FIG. 4 is a partial perspective view of the plastic brace of FIG. 3 and a cross section taken along lines 4-4 of FIG. 3.

As shown in FIGS. 3-4, the plastic brace 10 in accordance with the illustrated embodiment of the present disclosure comprises a first wall 32, a second wall 34 and a plurality of gussets 36 interconnecting the first wall 32 and second wall 34. The plastic brace 10 may be constructed of plastic and have a monolithic construction, and may be formed by injection molding. The plastic brace 10 may be constructed of any suitable plastic resin or other plastic. The plastic brace 10 may be constructed by any other suitable means and may have any other suitable monolithic or other construction in accordance with other embodiments of the present disclosure.

The first wall 32 and the second wall 34 are each generally rectangular and have substantially the same dimensions. The first wall 32 and the second wall 34 are joined at a 90 degree angle along the length of their lateral borders, with the lateral borders forming a curvature. In accordance with other embodiments, the angle between the first wall 32 and second wall 34 may have any other suitable magnitude.

The first wall 32 includes a first side 42 for engaging the floor 12 of the truck 14, and a second side 44 that faces upward when the first wall is positioned on the floor of the truck. The second wall 34 includes a first side 52 for engaging one of the cargo pallets 16, and a second side 54 that faces away from the cargo pallet 16 when the second wall engages the cargo pallet.

The first wall 32 includes a plurality of raised reinforcements 60 extending from the second side 44 of the first wall 32 defining the plurality of holes 24. The raised reinforcements 60 provide additional structural support to the plastic brace 10. The holes 24 extend through the first wall 32 for receiving the fasteners 22 for securing the plastic brace 10 to the floor 12 of the truck 14. The raised reinforcements 60 have a generally truncated conical configuration and are disposed about the holes 24. In the illustrated embodiment, each plastic brace 10 includes six raised reinforcements 60 defining six holes 24. Any other suitable numbers of raised reinforcements 60 and holes 24 may be instead included in accordance with other embodiments of the present disclosure. Further the raised reinforcements 60 may have any other suitable structure or even be eliminated in accordance with other embodiments of the present disclosure.

The gussets 36 are spaced along the widths of the first wall 32 and the second wall 34, and provide additional structural support to the plastic brace 10. Each gusset 36 has a first side 70 joined to the second side 44 of the first wall 32, extending the entire or substantially the entire width of the first wall 32;

and a second side 72 joined to the second side 54 of the second wall 34, extending the entire or substantially the entire width of the second wall 34. The first and second sides 70 and 72 of each gusset 36 are interconnected by a third side 74. Each gusset 36 includes a cut-out portion 76 along the third side 74 for manufacturing economies.

In the illustrated embodiment, each plastic brace 10 includes four gussets 36, and two raised reinforcements 60 are disposed between each pair of the gussets. Any other suitable numbers of gussets 36 can be used in accordance with other embodiments of the present disclosure. Further, the gussets 36 may have any other suitable structure or may even be eliminated in accordance with other embodiments of the present disclosure.

With reference to FIGS. 1-2, the plastic braces 10 are secured to the floor 12 by fasteners 22 which extend through the holes 24 and which have been hammered into or otherwise secured to the wood floor 12 of the truck 14. When the fasteners 22 are installed, the raised reinforcements 60 are disposed about the fasteners 22 providing further support to the plastic braces 10. The illustrated fasteners 22 are in the form of double-headed nails but may be in any other suitable form and may engage the floor 12 of the truck 14 in any other suitable manner.

Figure 5:
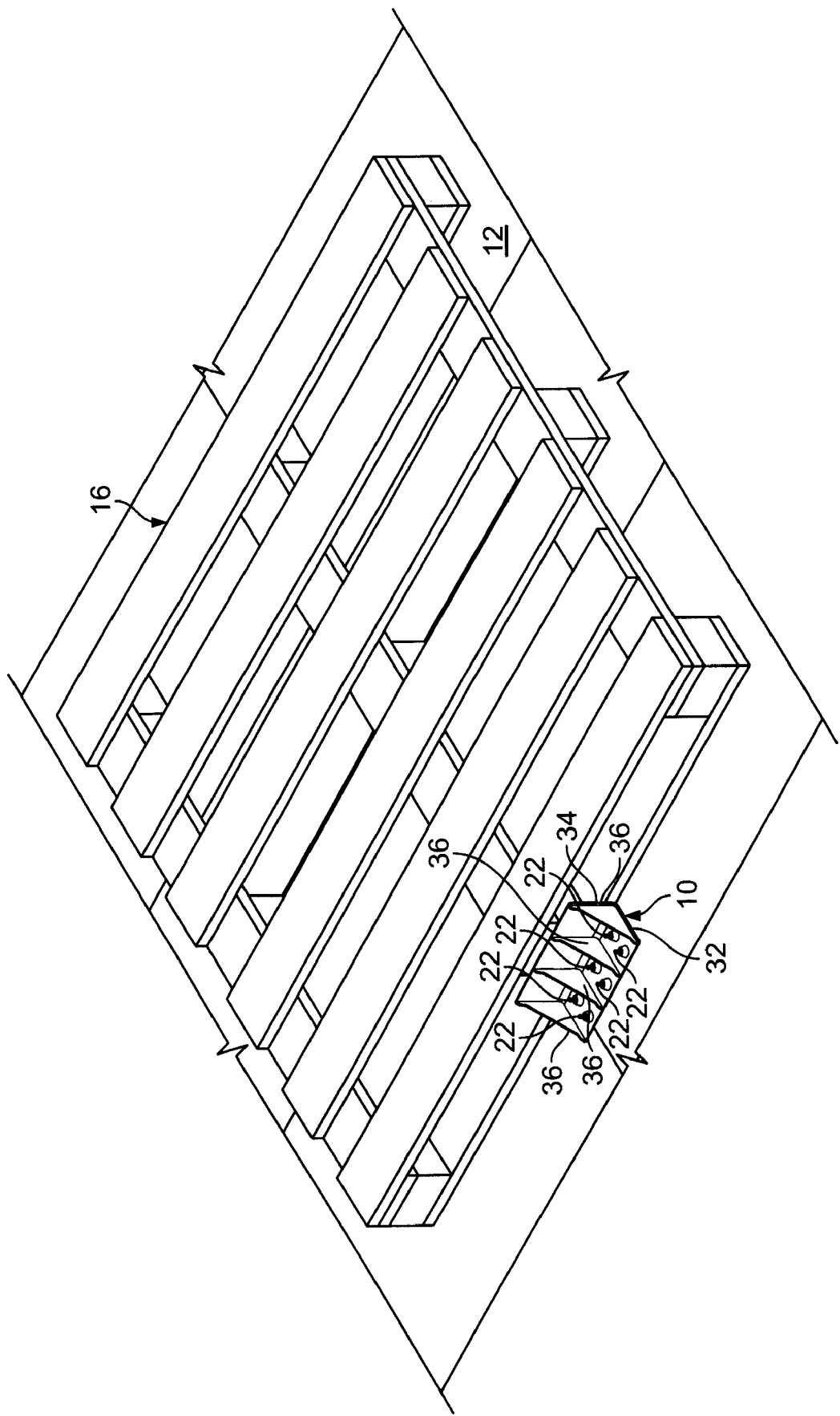
FIG. 5 is a partial perspective view illustrating a single plastic brace of FIGS. 3 and 4 restraining a cargo pallet in accordance with another embodiment of the present disclosure.

The illustrated cargo pallets 16 are conventional cargo transport pallets. The cargo pallets 16 can be in the form of any other type of pallet, including any type of skid or other any other type of structure for transporting cargo in accordance with other embodiments of the present disclosure. Further, any suitable number of plastic braces 10 in accordance with the present disclosure may be used to restrain movement of the cargo pallets 16. For example, although FIG. 2 shows a pair of plastic braces 10 being used to restrain one cargo pallet 16, a single plastic brace 10 can instead be used to restrain the cargo pallet 16 in accordance with the embodiment of FIG. 5.

Figure 6:
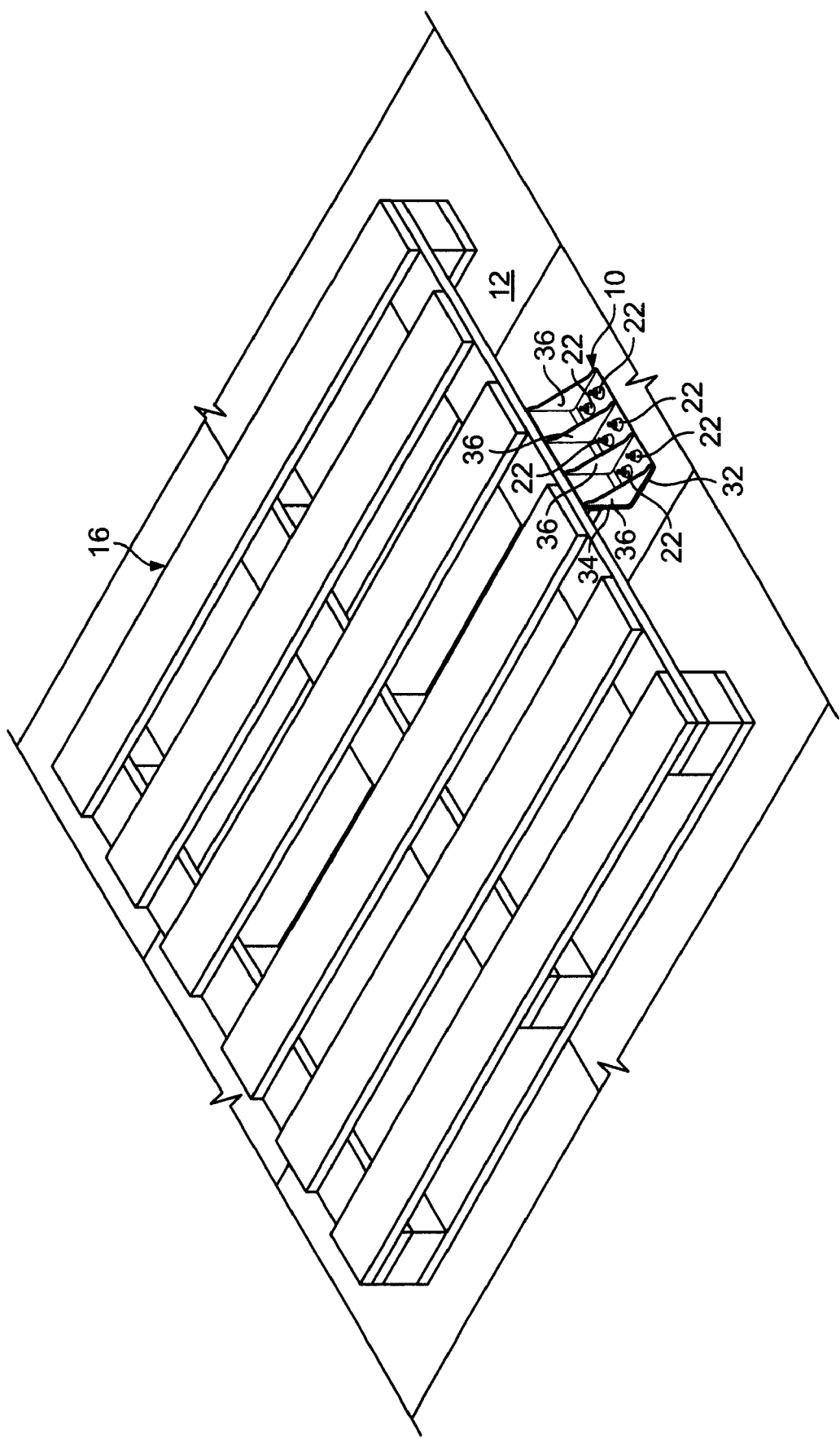
FIG. 6 is a partial perspective view illustrating a single brace of FIGS. 3 and 4 restraining a cargo pallet in accordance with another embodiment of the present disclosure.

Further, the plastic braces 10 can be disposed adjacent the front and/or back of the cargo pallet 16 to prevent or otherwise restrain the cargo pallet from forward or rearward movement (see, e.g., FIGS. 1, 2 and 5), or can be disposed adjacent either or both sides of the cargo pallet to prevent or otherwise restrain the cargo pallet from lateral movement (see, e.g., FIG. 6). The plastic braces 10 may be used on wood floors of trucks or other shipping containers, or, depending upon the fasteners employed, any other types of floors. The plastic braces 10 can sustain large loads because of, among other reasons, the gussets 36 and the raised reinforcements 60.

The present disclosure therefore also provides a method for restraining the cargo pallet 16 disposed on the floor 12 of the truck 14 or any other container. The method comprise: positioning on the floor 12 adjacent the cargo pallet 16 the plastic brace 10, engaging the plastic brace and the cargo pallet, and securing the plastic brace to the floor with the fastener 22. The positioning may include positioning the first wall 32 of the plastic brace 10 on the floor 12, and the engaging may include engaging the second wall 34 of the plastic brace and the cargo pallet 16. The engaging includes positioning the second wall 34 either in contact with the cargo pallet 16 or otherwise immediately adjacent the cargo pallet such that it will function to restrain the cargo pallet upon movement of the cargo pallet. The plastic brace 10 may be in the form described above or have any other suitable construction and configuration.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments.

There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A method for restraining a cargo pallet disposed on a floor of a container without raising the cargo pallet, the method comprising:

positioning on the floor adjacent the cargo pallet a monolithic plastic brace that includes a first wall and a second wall joined to the first wall and extending perpendicular thereto, such that the first wall engages the floor, the plastic brace further including a plurality of gussets interconnecting the first and second walls for strengthening the brace, the first wall, second wall and gussets forming the monolithic construction and being formed by injection molding, each of the gussets having a substantially triangular configuration each of the gussets has a first side, a second side, and a third side interconnecting the first and second sides and extending at a diagonal relative to the first and second walls, the third side defining a cut-out portion;

abuttingly engaging the second wall of the plastic brace and the cargo pallet without raising the cargo pallet, and securing the plastic brace to the floor with a first fastener.

2. The method of claim 1 wherein the first wall includes a first raised reinforcement defining a first hole and the securing includes inserting the first fastener through the first hole and engaging the first fastener with the floor.

3. The method of claim 2 wherein there are a plurality of fasteners, including the first fastener, and wherein the first wall includes a plurality of raised reinforcements, including the first raised reinforcement, defining a plurality of holes, including the first hole, and the securing includes inserting said plurality of fasteners through the holes and engaging said plurality of fasteners with the floor.

4. A method for restraining a cargo pallet disposed on a floor of a container, the method comprising:

positioning on the floor adjacent the cargo pallet a plastic brace, engaging the plastic brace and the cargo pallet, and securing the plastic brace to the floor with a fastener, wherein the plastic brace includes a first wall and a second wall joined to the first wall and extending perpendicular thereto, and wherein:

the positioning includes positioning the first wall of the plastic brace on the floor, and the engaging includes engaging the second wall of the plastic brace and the cargo pallet; and wherein the first wall includes a raised reinforcement having a truncated conical configuration and defining a hole, and the securing includes inserting the fastener through the hole and engaging the fastener with the floor.

5. The method of claim 1 wherein the first fastener is a double-headed nail, and the securing includes inserting the double headed nail through a hole defined by the plastic brace.

6. The method of claim 1 further including:
positioning on the floor adjacent the cargo pallet an other plastic brace,
engaging the other plastic brace and the cargo pallet, and
securing the other plastic brace to the floor with an other fastener.

7. The method of claim 6 wherein the other plastic brace includes a first wall and a second wall joined to the first wall extending perpendicular thereto, and wherein:
the positioning of the other plastic brace includes positioning the first wall of the other plastic brace on the floor, and
the engaging of the other plastic brace includes engaging the second wall of the other plastic brace and the cargo pallet.

8. The method of claim 1 wherein the first wall of the plastic brace includes a raised reinforcement defining a hole and wherein the securing includes inserting the first fastener through the hole defined by the raised reinforcement and engaging the first fastener with the floor.

9. The method of claim 8 wherein the first fastener comprises a nail and the inserting includes hammering the nail through the hole and into the floor.

10. The method of claim 8 wherein the first fastener comprises a double headed nail and the inserting includes hammering the double-headed nail through the hole and into the floor.

11. A method for restraining a cargo pallet disposed on a floor of a container, the method comprising:
positioning on the floor adjacent the cargo pallet a plastic brace,
engaging the plastic brace and the cargo pallet, and
securing the plastic brace to the floor with a fastener;
wherein the plastic brace includes a wall having a raised reinforcement having a truncated conical configuration defining a hole and wherein the securing the plastic brace to the floor includes inserting the fastener through the hole defined by the raised reinforcement and engaging the fastener with the floor.

12. The method of claim 1 wherein there are a plurality of fasteners, including the first fastener, and wherein the first wall of the plastic brace has a plurality of raised reinforcements, each raised reinforcement defining a hole, and wherein the securing includes inserting said plurality of fasteners through the holes defined by the raised reinforcements and engaging said plurality of fasteners with the floor.

* * * * *